(12) United States Patent
Cairns (10) Patent No.: US 7,983,208 B2
(45) Date of Patent: Jul. 19, 2011

(54) MMSE CHANNEL ESTIMATION IN A COMMUNICATIONS RECEIVER

(75) Inventor: Douglas A. Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 808 days.

(21) Appl. No.: 11/935,604

(22) Filed: Nov. 6, 2007

(65) Prior Publication Data

US 2008/0291887 A1 Nov. 27, 2008

Related U.S. Application Data

(60) Provisional application No. 60/887,372, filed on Jan. 31, 2007.

(51) Int. Cl.
*H04B 7/216* (2006.01)
(52) U.S. Cl. ........................... 370/320; 370/349
(58) Field of Classification Search .................. 370/320, 370/335, 342, 349, 441; 375/316, 267, 299, 375/347, 349, 142, 143, 144, 148, 150, 152
See application file for complete search history.

(56) References Cited

U.S. PATENT DOCUMENTS

| | | | |
|---|---|---|---|
| 5,822,380 A | 10/1998 | Bottomley | |
| 6,363,104 B1 | 3/2002 | Bottomley | |
| 6,714,585 B1 | 3/2004 | Wang et al. | |
| 7,724,841 B2 * | 5/2010 | Bottomley et al. | 375/316 |
| 2005/0069023 A1 | 3/2005 | Bottomley et al. | |
| 2005/0201447 A1 | 9/2005 | Cairns et al. | |
| 2006/0007990 A1 | 1/2006 | Cozzo et al. | |
| 2006/0251156 A1 | 11/2006 | Grant et al. | |
| 2006/0268962 A1 | 11/2006 | Cairns et al. | |
| 2008/0080646 A1 | 4/2008 | Bottomley et al. | |

FOREIGN PATENT DOCUMENTS

| | | |
|---|---|---|
| EP | 1379040 | 1/2004 |
| WO | 01/61950 | 8/2001 |
| WO | 2005/096517 | 10/2005 |
| WO | 2006/010159 | 1/2006 |

OTHER PUBLICATIONS

Co-pending U.S. Appl. No. 11/538,074, filed Oct. 3, 2006.
Co-pending U.S. Appl. No. 11/841,264, filed Aug. 20, 2007.
Diggavi, Suhas, et al. "An Interference Suppression Scheme with Joint Channel-Data Estimation." IEEE Journal on Selected Areas in Communication, Nov. 1999, pp. 1924-1939, vol. 17, No. 11.

(Continued)

*Primary Examiner* — Brenda Pham
(74) *Attorney, Agent, or Firm* — Coats & Bennett, P.L.L.C.

(57) ABSTRACT

Methods and apparatus are disclosed for calculating a channel response for use in received signal processing. In an exemplary embodiment, a method comprises calculating a channel response correlation matrix based on measured channel responses derived from pilot symbols in a received signal and forming a traffic data correlation matrix based on measurements of traffic symbols in the received signal. The traffic data correlation matrix, the channel response correlation matrix, and the measured channel responses are used in an minimum mean-squared error (MMSE) estimation process to calculate the channel response estimates. In one or more embodiments, the calculated channel response estimates comprise estimates of net channel response corresponding to signal processing delays in a G-RAKE receiver. An exemplary receiver circuit comprises a baseband processor configured to calculate channel response estimates according to one or more of the disclosed methods.

23 Claims, 4 Drawing Sheets

OTHER PUBLICATIONS

Chaufray, Jean-Marie, et al. "Consistent Estimation of Rayleigh Fading Channel Second-Order Statistics in the Context of the Wideband CDMA Mode of the UMTS." IEEE Transactions on Signal Processing, Dec. 2001, pp. 3055-3061, vol. 49, No. 12.

Wang, Hai et al. "Approaches for Fast, Adaptive, Generalized Rake Reception." Research Disclosure Journal. Nov. 2003, 3 pages, No. 475041, Kenneth Mason Publications, Ltd.

Dogandzic, Aleksandar, et al. "Semi-Blind SIMO Flat-Fading Channel Estimation in Unknown Spatially Correlated Noise Using the EM Algorighm." IEEE Transactions on Signal Processing, Jun. 2004, pp. 1791-1797, vol. 52, No. 6.

Cairns et al., "Low Complexity Parameter Estimation for the Generalized Rake Receiver," 2004 IEEE 11th Digital Signal Processing Workshop & IEEE Signal Processing Education Workshop, Aug. 1, 2004, pp. 191-195.

Kutz et al., "Low Complexity Implementation of a Downlink CDMA Generalized Rake Receiver," IEEE Vehicular Technology Conference, Sep. 24, 2002, pp. 1357-1361, vol. 1.

Cairns, D. A. "Selective Signal Demodulation Method and Apparatus." Co-pending U.S. Appl. No. 11/841,264, filed Aug. 20, 2007.

* cited by examiner

MMSE CHANNEL ESTIMATION IN A COMMUNICATIONS RECEIVER

RELATED APPLICATIONS

This application claims priority under 35 U.S.C. §119(e) from U.S. Provisional Patent Application Ser. No. 60/887,372, which was filed on 31 Jan. 2007 and is entitled "MMSE Channel Estimator for WCDMA."

BACKGROUND

The present invention generally relates to wireless communication devices, and particularly relates to calculating channel response estimates for use in received signal processing.

Signals transmitted in a wireless communication system, such as a Code Division Multiple Access (CDMA) or Wideband CDMA (WCDMA) system, are subjected to multiple sources of interference and noise as they propagate via radio channels. Interference and noise components that affect signal transmission and reception in a wireless communication system are broadly referred to as impairments. Seemingly independent signal impairments may in fact be correlated. Several well-known receivers such as the Generalized-RAKE (G-RAKE) receiver and its chip equalizer (CEQ) counterpart use knowledge of impairment correlations to improve received signal processing. G-RAKE receivers and CEQs also use estimates of multipath fading channel response in their received signal processing.

For example, a G-RAKE receiver includes various signal "fingers" where each finger has an assigned delay for receiving a particular image of a multipath signal and a correlator for de-spreading the received image. In combination, the signal fingers de-spread multiple signal images of a received multipath signal, thus utilizing the multipath channel dispersion phenomenon. Typically, a finger is placed at a delay corresponding to each multipath component, with additional fingers placed off of path delays for capturing impairment correlations information. The finger outputs are weighted and coherently combined to improve received signal demodulation and/or the estimation of received signal quality. The processing weights assigned to the finger outputs are conventionally calculated as a function of the channel response and impairment correlations. Accordingly, knowledge of signal impairments is used to improve received signal processing. In a similar manner, CEQs utilize impairment correlations information for improving received signal processing where the selection of equalization filter taps in a CEQ is analogous to the placement of fingers in a G-RAKE receiver and the generation of equalization filter coefficients is analogous to the generation of G-RAKE combining weights.

Parametric G-RAKE receivers estimate impairment correlations using a modeling approach. The model employs parameters that can be estimated in a number of ways, such as least-squares fitting. The parametric impairment correlations modeling process depends on the corresponding model parameters and on estimates of the channel response. However, signal impairments affect the channel response estimation process, particularly when the impairments are severe. As such, impairment correlation estimation and channel response estimation are generally interdependent, particularly when interference is severe.

SUMMARY

According to the methods and apparatus taught herein, channel response estimates are determined for each of a plurality of signal processing delays in a receiver, using a minimum mean-squared error (MMSE) estimation process. The channel response estimates may be used in received signal processing, such as for demodulation or signal quality reception estimation, as well as for estimating signal impairments such as inter-cell and intra-cell interference. The methods disclosed herein improve channel response estimation accuracy and reliability by accounting for interdependencies between signal impairments and channel responses in an interference-limited environment.

In an exemplary embodiment, a method comprises calculating a channel response correlation matrix based on measured channel responses derived from pilot symbols in a received signal and forming a traffic data correlation matrix based on measurements of traffic symbols in the received signal. The traffic data correlation matrix, the channel response correlation matrix, and the measured channel responses are used in a minimum mean-squared error (MMSE) estimation process to calculate the channel response estimates. In one or more embodiments, the calculated channel response estimates comprise estimates of net channel response corresponding to signal processing delays in a G-RAKE receiver.

In one or more embodiments, calculating the channel response correlation matrix comprises calculating a medium channel response estimate for each of a plurality of path delays for the received signal, based on the measured channel responses, and calculating the channel response correlation matrix based on the medium channel response estimates. In some of these embodiments, the medium channel response estimates are calculated by measuring a net channel response for each of a plurality of signal processing delays, using the pilot symbols, to obtain the measured responses, and calculating the medium channel response estimates based on the measured channel response and information relating medium channel response at the path delays to net channel response at the signal processing delays.

According to one embodiment of a receiver circuit, the receiver comprises a baseband processor. The baseband processor is configured to calculate a channel response correlation matrix based on measured channel responses derived from pilot symbols in a received signal and to form a traffic data correlation matrix based on measurements of traffic symbols in the received signal. The baseband processor is further configured to use the traffic data correlation matrix, the channel response correlation matrix, and the measured channel responses in a minimum mean-squared error (MMSE) estimation process to calculate the channel response estimates.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
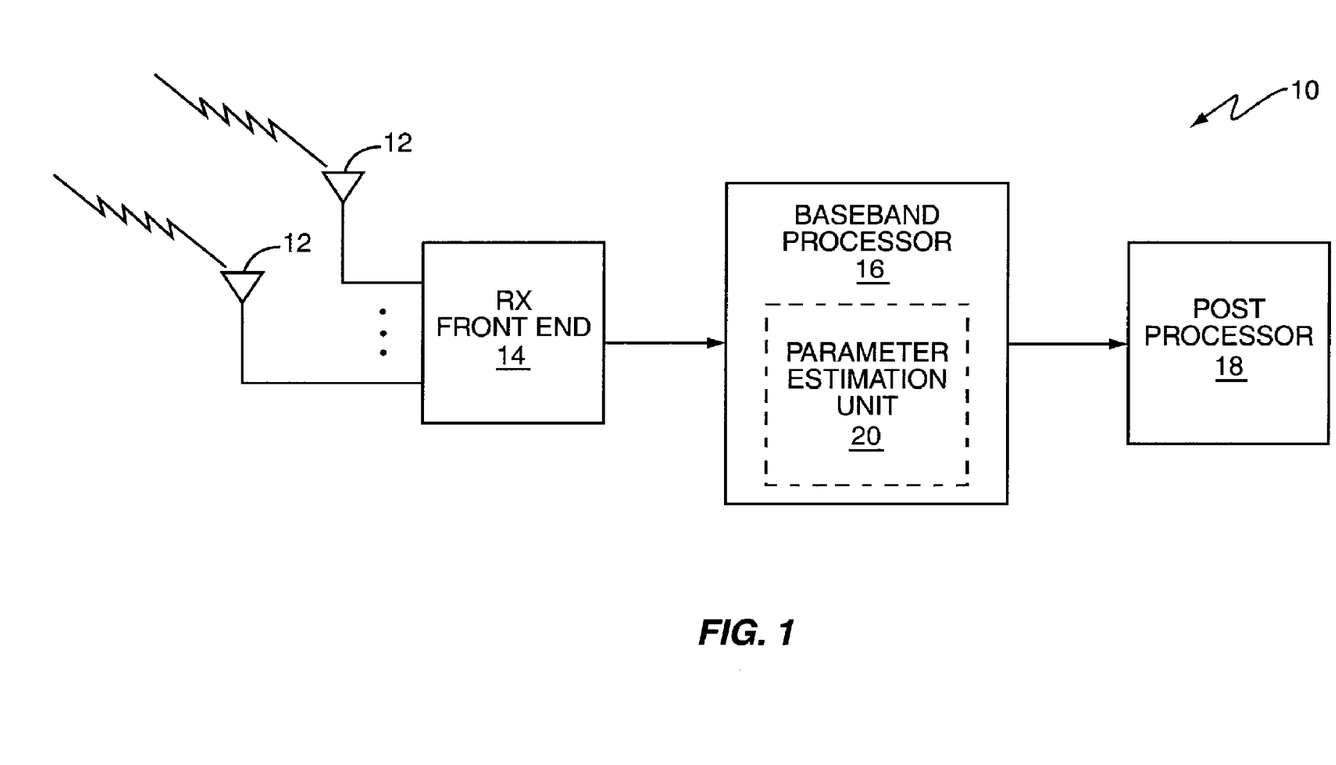
FIG. 1 is a block diagram of one embodiment of a wireless communication receiver having a baseband processor configured to calculate channel response estimates.

FIG. 1 illustrates an embodiment of a wireless communication receiver 10 such as may be included in a base station, cellular phone or other mobile communications terminal or device. The wireless communication receiver 10 comprises one or more antennas 12, front-end circuitry 14, baseband processor 16 and post-processor 18. The antenna(s) 12 receive signal energy propagated over one or more multipath fading channels and the front end circuitry 14 filters and down-converts the received signals to produce corresponding baseband signals.

In much of the discussion that follows, a single receive antenna 12 is assumed, for purposes of simplification. Those skilled in the art will appreciate, however, that the inventive techniques described herein may be readily applied to a multi-antenna receiver system. The practitioner will recognize that the formulas given herein may be extended in a straightforward manner for multi-antenna processing according to conventional approaches.

In any case, depending on whether wireless communication receiver 10 is implemented in a mobile terminal or a base station, antenna(s) 12 may receive signals from a downlink communication channel, such as the High-Speed Downlink Shared Channel (HS-DSCH) of a UMTS system employing High-Speed Packet Access technology, or an uplink link communication channel. In either event, baseband processor 16, which may comprise a G-RAKE receiver or a chip equalizer, produces soft bit values or symbol estimates based on the baseband signals. Post-processor 18 performs other signal processing operations on the soft bit values, such as error correction, hard-decision decoding, and so on.

Baseband processor 16 includes a parameter estimation unit 20 configured to calculate channel response estimates for each of a plurality of signal processing delays utilized by the G-RAKE or chip equalizer. In several embodiments, parameter estimation unit 20 also generates impairment correlation estimates using a parametric modeling process that incorporates the channel response estimates. As will be shown below, interdependencies between impairment correlations and channel response are reflected in both the impairment correlation estimates and the channel response estimates generated by the parameter estimation unit 20, resulting in improved receiver performance.

In the disclosure that follows, two distinct types of channel coefficients, or channel responses, will be discussed. The first type, the medium channel response, reflects the response of each multipath fading channel delay being considered. The second type, the net channel response, reflects the overall response of the signal transmission system with respect to the signal processing delays, including the response of the transmitter, the channel and the receiver. These two types of channel coefficients will be referred to repeatedly throughout the disclosure. The medium coefficients, or medium channel response, will be denoted by g, where g is an L×1 vector of complex values associated with the L radio channel paths taken by the multipath signal. The net coefficients, or net channel response, will be denoted by h, where h is an M×1 vector of complex values (M≧L) associated with the M receiver fingers.

Medium channel response coefficients may readily be converted to net channel response coefficients using the expression:

$$h = Bg, \quad (1)$$

where B is an M×L conversion matrix that incorporates information characterizing the transmitter and receiver contributions to the composite, or net, channel response. The (i, j) element of B is thus given by:

$$b_{i,j} = R_{TX/RX}(d_i - \tau_j) \quad (2)$$

Here, $R_{TX/RX}(\lambda)$ is the convolution of the transmit and receive filters evaluated at $\lambda$, $d_i$ is the delay of the i-th receiver finger, and $\tau_j$ is the j-th path delay. The corresponding conversion from net to medium coefficients is given by:

$$g = (B^H B)^{-1} B^H h. \quad (3)$$

The parameter estimation process is begun by obtaining measured net channel response data from de-spread pilot symbols, training data, or other signals known a priori to the wireless communication receiver 10. These measurements are typically performed over a single slot (2560 chips in WCDMA). In one embodiment, the measured net channel response $h_m$ is obtained from measurements of de-spread pilot symbols by:

$$h_m = \frac{1}{N_P} \sum_{k=0}^{N_P-1} x_{pilot}(k) s^*(k), \quad (4)$$

where $x_{pilot}(k)$ is the vector of de-spread pilot symbols for the k-th symbol in the current slot, $s^*(k)$ is the complex conjugate of the known value for the k-th symbol, and $N_P$ is the number of symbols used in the measurement. (In a 3GPP HSDPA system, $N_P$ is typically 10, as there are 10 pilot symbols per slot.) Once $h_m$ has been derived from pilot symbol measurements, corresponding estimates for the medium channel response may be calculated, using Eq. (3):

$$g_m = (B^H B)^{-1} B^H h_m$$

In many conventional receivers, the measured net channel response $h_m$ and corresponding medium channel response estimates $g_m$ are used in subsequent signal processing to calculate impairment estimates, to estimate received signal quality, and/or to calculate combining weights for generating decision statistics for demodulating traffic data. However, as noted above, the channel response estimates and impairment estimations are interdependent. Incorporating impairment-related information into the estimation process can yield improved channel response estimates, and thus improve receiver performance, particularly in interference-limited environments.

For instance, a minimum mean-squared error (MMSE) formulation for medium channel response estimation that accounts for signal impairments is given by:

$$g_{MMSE} = R_g B^H (B R_g B^H + R_u/N_p)^{-1} h_m, \quad (5)$$

where $R_g$ is the medium coefficient correlation matrix, i.e., $E\{gg^H\}$, $R_u$ is the impairment covariance matrix, and $h_m$ is the measured net channel response. This formulation was used in U.S. patent application Ser. No. 11/538,074, filed Oct. 3, 2006, by Bottomley, et al., and entitled "Method and Apparatus for Iteratively Calculating Channel Response Estimates." (The Bottomley application is incorporated by reference herein in its entirety.) In the Bottomley application, an iterative procedure for improving receiver performance by improving channel estimation is described. At each iteration, MMSE channel estimates are given by:

$$h_{MMSE} = BR_g B^H (BR_g B^H + R_u/N_p)^{-1} h_m \quad (6)$$

$$g_{MMSE} = (B^H B)^{-1} B^H h_{MSSE}.$$

In the Bottomley application, the MMSE channel estimates are used to successively refine the estimate of the impairment covariance matrix $R_u$. In the first iteration, the estimate of $R_u$ ignores interference and focuses on white noise only (i.e. $R_u = R_n$, where the (i,j) element of $R_n$ is given by $R_p(d_i - \tau_j)$, and $R_p(\lambda)$ is the autocorrelation of the receive pulse shape filter evaluated at $\lambda$). The MMSE channel estimates calculated using this first estimate of $R_u$ are then used to update a parametric G-Rake estimate of $R_u$. (U.S. Patent Publication No. 2005/0201447, filed Mar. 12, 2004, by Cairns, et al., and entitled "Method and Apparatus for Parameter Estimation in a Generalized RAKE Receiver," discloses a method for modeling received signal impairment correlations, and is incorporated herein by reference in its entirety.) The new estimate of $R_u$ is then used in Eq. (6) to refine the MMSE channel estimates. This procedure may be repeated as many times as necessary.

Under certain conditions, especially in interference-limited signal environments, prior art approaches to improved channel estimation may not yield the desired improvements. In some instances, the medium coefficient correlation matrix $R_g$ is calculated from the measured net channel response coefficients and a measured impairment covariance matrix. This approach may not provide sufficient accuracy for MMSE channel estimation. In other instances, using a noise-only assumption as a starting estimate for $R_u$ in an iterative method will yield unsatisfactory results, particularly when SINR is high and the white noise contribution is correspondingly small.

Figure 2:
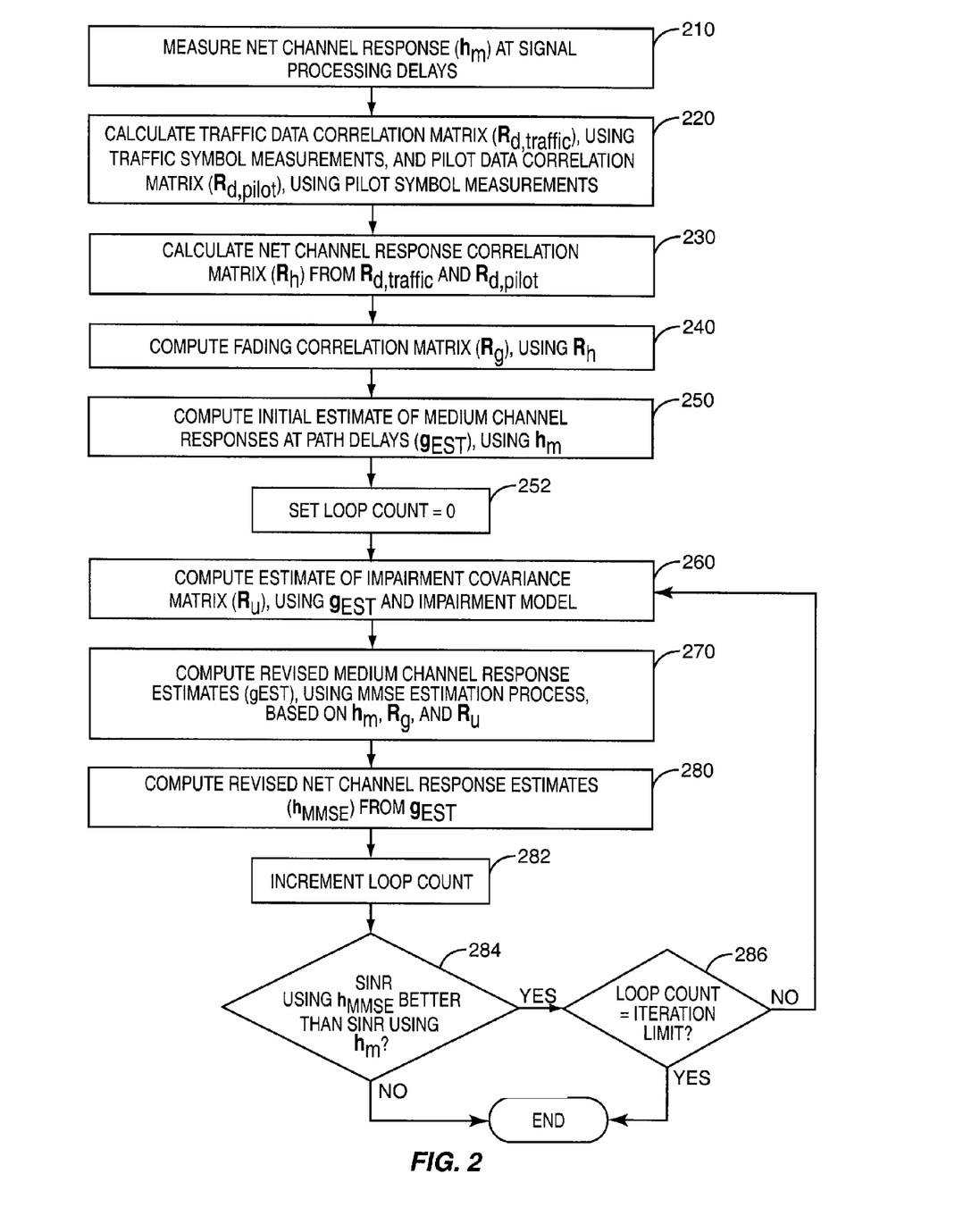
FIG. 2 is a flow diagram illustrating an exemplary method for calculating channel response estimates.
Figure 3:
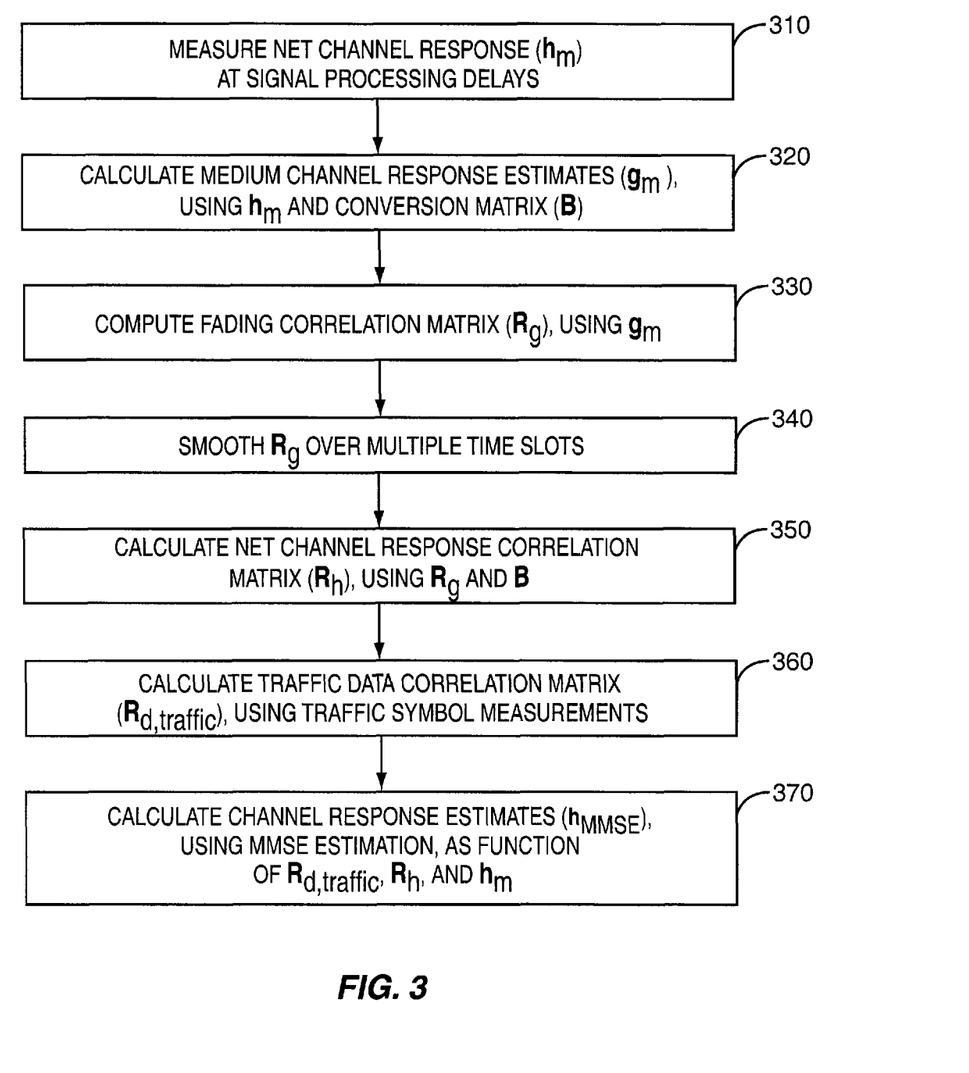
FIG. 3 is a flow diagram illustrating another exemplary method for calculating channel response estimates.

FIGS. 2 and 3 thus illustrate improved methods for determining channel response estimates. Each method employs MMSE estimation.

The method of FIG. 2 begins at block 210 with a measurement of the net channel response with respect to the receiver's signal processing delays. In a G-RAKE implementation, these net channel response measurements correspond to the M receiver fingers. As discussed above, these measurements are taken according to conventional means, such as according to Eq. (4), and are typically made using pilot symbols from a pre-determined time interval such as a slot.

At block 220, a pilot data correlation matrix is calculated. In one embodiment, the pilot data correlation matrix is formed according to:

$$\hat{R}_{d,pilot} = \frac{1}{N_P} \sum_{k=0}^{N_P-1} x_{pilot}(k) x_{pilot}^H(k), \quad (7)$$

using the same pilot symbol measurements used for the channel response measurements of block 220, although those skilled in the art will appreciate that other pilot channel measurements may be used. Similarly, a traffic data correlation matrix is also calculated, using measurements of traffic data symbols for one or more codes. In an exemplary embodiment:

$$\hat{R}_{d,traffic} = \frac{1}{N_c N_T} \sum_{q=0}^{N_c-1} \sum_{k=0}^{N_T-1} x_{traffic}^q(k) (x_{traffic}^q(k))^H, \quad (8)$$

where $x_{traffic}^q(k)$ is the vector of de-spread traffic symbols corresponding to the q-th code for the k-th symbol in the current slot. $N_c$ is the number of codes used to estimate the traffic data correlation matrix and $N_T$ is the number of symbols per code. $N_T$ may typically be 160, corresponding to the number of traffic data symbols of spreading factor 16 in a slot.

At block 230, an estimated net channel response correlations matrix $\hat{R}_h$ is calculated from the traffic data correlation matrix and the pilot data correlation matrix:

$$\hat{R}_h(n) = \mu \hat{R}_h(n-1) + (1-\mu)(\hat{R}_{d,pilot} - \hat{R}_{d,traffic}), \quad (9)$$

where n indexes the current time interval and $\mu$ is a parameter, between 0 and 1, for smoothing the net channel response correlation matrix over multiple time intervals. Those skilled in the art will appreciate that for the first time interval $\hat{R}_h = \hat{R}_{d,pilot} - \hat{R}_{d,traffic}$. Eq. (9) approximates the actual net channel response correlation matrix because:

$$R_{d,traffic} = E_d h h^H + R_u, \text{ and}$$

$$R_{d,pilot} = E_p h h^H + R_u.$$

At block 240, the fading correlation matrix $R_g$ is estimated, using $\hat{R}_h$. In one embodiment, fitting parameters $\alpha, \beta, \gamma$ are determined by performing least squares fitting of:

$$\hat{R}_{d,traffic} \approx \alpha R_I(g_m) + \beta R_n + \gamma h_m h_m^H. \quad (10)$$

The parameter $\gamma$ is used to calculate $\hat{R}_g$:

$$\hat{R}_g = \left(\frac{1}{1-\gamma}\right)(B^H B)^{-1} B^H \hat{R}_h (B^H B)^{-1} B^H. \quad (11)$$

However, $\gamma$ is typically very small, so there is generally little error in neglecting the $$\frac{1}{1-\gamma}$$

term. Furthermore, because fading in the L multipath channels can generally be assumed to be independent, the off-diagonal elements of $\hat{R}_g$ may advantageously be set to zero.

At block 250, an initial estimate of the medium channel responses, corresponding to the L multipath delays, is calculated, using the measured net channel response and Eq. (3):

$$\hat{g} = (B^H B)^{-1} B^H h_m. \quad (12)$$

As discussed above, B is a conversion matrix incorporating the transfer functions of the transmit and receive filters. This initial estimate of the medium channel responses is then updated in an iterative calculation as follows.

After initializing a loop counter, at block 252, an estimate of the impairment covariance matrix, $\hat{R}_u$, is computed at block 260, using the estimated medium channel response $\hat{g}$. In one or more embodiments:

$$\hat{R}_u = \alpha R_I(\hat{g}), \quad (13)$$

where $R_I(g)$ is an interference correlations term having elements associated with the medium channel response estimate and $\alpha$ is one of the fitting parameters determined above, at block 240. The interference correlations terms may be determined in accordance with any suitable formulation, such as the formulations given in the previously referenced Cairns publication. In that publication, the impairment correlations, $R_u$, were modeled as:

$$R_u = \alpha R_I + \beta R_n \tag{14}$$

where:

$$R_I(d_1, d_2) = \sum_{l=0}^{L-1} \sum_{q=0}^{L-1} g_l g_q^* \sum_{\substack{m=-\infty \\ m \neq 0}}^{m=\infty} R_p(d_1 - mT_c - \tau_l) R_p^*(d_2 - mT_c - \tau_q),$$

$$R_n(d_1, d_2) = R_p(d_1 - d_2)$$

and where $$g(\tau) = \sum_{l=0}^{L-1} g_l \delta(\tau - \tau_l)$$

(complex channel model), $R_p(\tau)$ is the pulse shape autocorrelation function, $T_c$ is the chip period, and $d_k$ is the delay of the k-th G-RAKE finger. Those skilled in the art will recognize that the impairment estimate of Eq. (13) includes only interference components; this simplified model may be used for purposes of refining the channel response estimates in high-SINR environments.

At block 270, the estimated impairment correlation matrix $\hat{R}_u$ is used to update the medium channel response estimates, using an MMSE estimation process:

$$\hat{g} = \hat{R}_g B^H \left( B \hat{R}_g B^H + \hat{R}_u / N_p \right)^{-1} h_m. \tag{15}$$

Revised net channel response estimates may then be calculated from the updated medium channel response estimates, as shown at block 280. In an exemplary embodiment:

$$h_{MMSE} = B \hat{g}. \tag{16}$$

After incrementing the loop counter at block 282, the revised net channel response estimates may be tested to determine whether they are superior to the measured channel response. Testing may comprise evaluating a figure of merit for the measured channel response and a corresponding figure of metric for the channel response estimates. For example, as shown at block 284, estimates for SINR may be calculated using the measured net channel responses and the MMSE channel response estimates. These SINR estimates may be compared to determine whether the MMSE estimation process is yielding an improvement.

First, the SINR may be computed using the measured channel responses, according to conventional means. In an exemplary approach, an impairment covariance matrix $\hat{R}_{u,conventional}$ is estimated according to Eq. (14), using the fitting parameters $\alpha, \beta$ calculated at block 240. Preliminary combining weights $w_{conventional}$ are then obtained by solving:

$$\hat{R}_{u,conventional} w_{conventional} = h_m \tag{17}$$

Pilot symbol estimates $\hat{z}_{pilot}$ are computed, using $w_{conventional}$ and:

$$\hat{z}_{pilot}(m) = w^H x_{pilot}(m), \tag{18}$$

and the sample mean $\bar{z}_{pilot}$ and sample variance $\sigma_{\hat{z}}^2$ of $\hat{z}_{pilot}$ are computed:

$$\bar{z}_{pilot} = \frac{1}{10} \sum_{m=0}^{9} \hat{z}_{pilot}(m) \tag{19}$$

$$\sigma_{\hat{z}}^2 = \frac{1}{9} \sum_{m=0}^{9} (\hat{z}_{pilot}(m) - \bar{z}_{pilot})(\hat{z}_{pilot}(m) - \bar{z}_{pilot})^*.$$

The SINR using the conventional measured net channel responses is then:

$$SINR_{conventional} = \frac{\bar{z}_{pilot} \bar{z}_{pilot}^* - \sigma_{\hat{z}}^2 / N_p}{\sigma_{\hat{z}}^2}. \tag{20}$$

The SINR for the MMSE channel response estimates may be calculated in an identical manner, after obtaining combining weights according to:

$$\hat{R}_u w_{MMSE} = h_{MMSE}, \tag{21}$$

where $\hat{R}_u$ is the impairment matrix calculated at block 260 and $h_{MMSE}$ is the most recently updated channel response estimates calculated at block 280. If $SINR_{conventional} > SINR_{MMSE}$, then the measured channel response estimates are superior, and the iterative process should be terminated. If not, then the iterative MMSE channel response estimate should be retained.

If the MMSE channel response estimate checks out, then the estimation of $\hat{R}_u$ (block 260), $\hat{g}$ (block 270), and $h_{MMSE}$ (block 280) may be repeated one or more times (until the loop counter limit is reached, at block 286), to further refine the estimates. The MMSE channel estimates $h_{MMSE}$ may then be used for calculating combining weights, estimating SINR, and the like, using techniques well known to those skilled in the art.

A more streamlined method for estimating the net channel response is illustrated in FIG. 3. In this approach, rather than obtaining preliminary estimate of the impairment from a parametric fitting process, the calculated traffic data correlation matrix, $R_{d,traffic}$ is used as a preliminary impairment estimate.

This method begins in the same way as the previously described method, with conventional measurements of the net channel response, $h_m$, at the receiver's signal processing delays. These measurements are illustrated at block 310, followed by a calculation of the medium channel response estimates, $g_m$, at block 320, from $h_m$ and the conversion matrix B, according to Eq. 3.

At block 330, the fading correlation matrix $R_g$ is estimated directly from the medium channel response estimates, $g_m$. First:

$$\hat{R}_g = g_m^H g_m \tag{22}$$

is calculated. Because it can be assumed that the L multipath fading channels demonstrate independent fading, the off-diagonal elements of $\hat{R}_g$ may be set to zero. In some embodiments, $\hat{R}_g$ may be smoothed over multiple slots, as shown at block 340. For instance:

$$\hat{R}_g(n) = \lambda \hat{R}_g(n-1) + (1-\lambda) \hat{R}_g, \tag{23}$$

where $\hat{R}_g(n)$ is a smoothed estimate for slot n, $\hat{R}_g(n-1)$ is the smoothed estimate for the previous slot, and $\hat{R}_g$ is the slot estimate of block 330. λ is a smoothing parameter with a value selected to be between zero and one.

The smoothed fading correlations matrix $\hat{R}_g(n)$ is then converted to an estimate of the net channel response correlation matrix, $\hat{R}_h$, using the conversion matrix B, at block 350, according to:

$$\hat{R}_h = B\hat{R}_g(n)B^H. \quad (24)$$

At block 360, a traffic data correlation matrix is calculated, using measurements of traffic data symbols for one or more traffic codes. In an exemplary embodiment:

$$\hat{R}_{d,traffic} = \frac{1}{N_c N_T} \sum_{q=0}^{N_c-1} \sum_{k=0}^{N_T-1} x_{traffic}^q(k)(x_{traffic}^q(k))^H,$$

as was previously shown in Eq. (8). Accordingly, $x_{traffic}^q(k)$ is the vector of de-spread pilot symbols corresponding to the q-th code for the k-th symbol in the current slot. $N_c$ is the number of codes and $N_T$ is the number of symbols used. Again, $N_T$ may typically be 160, corresponding to the number of traffic data symbols of spreading factor 16 in a slot. Unlike the method of FIG. 2, however, the traffic data correlation matrix is used here as a preliminary estimate of the impairment correlation matrix $R_u$.

Thus, at block 370, MMSE net channel response estimates $h_{MMSE}$ are calculated, using an MMSE estimation process, from $\hat{R}_h$, $\hat{R}_{d,traffic}$, and the measured net channel response $h_m$. In an exemplary embodiment:

$$h_{MMSE} = \hat{R}_h \left( \hat{R}_h + \frac{1}{N_P} \hat{R}_{d,traffic} \right)^{-1} h_m. \quad (25)$$

(Those skilled in the art will recognize that this is equivalent to the formulation of Eq. (6).)

Typically, the MMSE net channel response estimates calculated according to the above method yield superior receiver performance compared to that obtained with conventionally obtained measured net channel responses. Thus, testing these estimates using, for example, SINR estimation, is generally not required but may optionally be performed. Similarly, iterative updates of $h_{MMSE}$ are generally not required. However, those skilled in the art will appreciate that the MMSE channel response estimates obtained at block 370 may be used to calculate a revised fading correlations matrix $\hat{R}_g$, in a similar manner to that illustrated at blocks 320 and 330, which may then be used to update the net channel response estimates $h_{MMSE}$.

Figure 4:
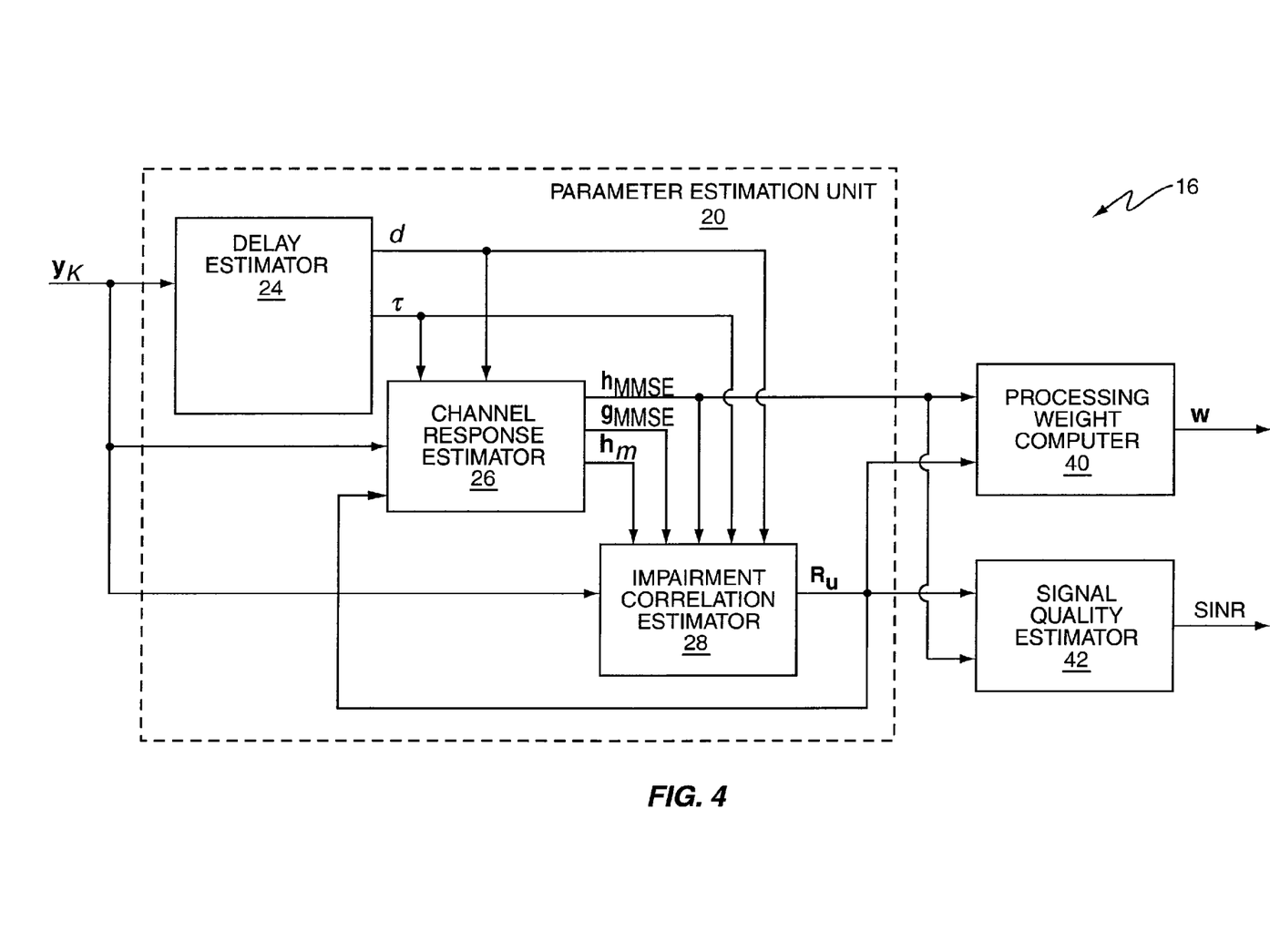
FIG. 4 is a block diagram of one embodiment of a baseband processor configured to calculate channel response estimates.

Referring now to FIG. 4, a more detailed illustration of one embodiment of baseband processor 16, including parameter estimation unit 20, is provided. According to this embodiment, parameter estimation unit 20 includes a delay estimator 24, a channel response estimator 26 and an impairment correlations estimator 28. Delay estimator 24 generates an estimate of a set of L channel path delays τ associated with one or more multipath fading channels from which signals are received using any known technique, for instance by evaluating an impulse response of the channel(s) over a range of delay values. Delay estimator 24 also generates a set of M signal processing delays d used for de-spreading received signals (e.g., G-RAKE finger delays or chip equalizer filter tap locations), again according to conventional methods. Those skilled in the art will appreciate that the path delays may be a subset of the processing delays. The signal processing delay values and path delay values are provided to the channel response estimator 26 and the impairment correlations estimator 28 for use in generating channel response and impairment correlation estimates, respectively.

Channel response estimator 26 calculates a medium channel response estimate, g, corresponding to the path delays, and an MMSE net channel response estimate, $h_{MMSE}$, corresponding to the signal processing delays, using one of the methods described above or a variant thereof. The medium and MMSE net channel response estimates are used by the impairment correlations estimator 28 to generate an estimate for the impairment correlation matrix, $\hat{R}_u$.

Baseband processor 16 uses the MMSE net channel response estimate $h_{MMSE}$ for further signal processing. In one embodiment, the baseband processor 16 further includes a processing weight computer 40 for calculating processing weights w, which may comprise G-RAKE combining weights or equalizer filter tap coefficients, based on the impairment correlations estimate and the MMSE net channel response estimates:

$$w = \hat{R}_u^{-1} h_{MMSE}. \quad (26)$$

Those skilled in the art will appreciate that the impairment correlation estimate $\hat{R}_u$ may be determined from MMSE medium channel response estimates, $g_{MMSE}$, which are in turn derived directly from the net channel response estimates $h_{MMSE}$. For example, given $h_{MMSE}$, the medium channel response estimates may be computed according to $g_{MMSE}32$ $(B^H B)^{-1} B^H h_{MMSE}$. The impairment correlation matrix $R_u$ may be then be modeled according to known techniques according to $R_u = \alpha R_f(g_{MMSE}) + \beta R_n$, where $R_f(g_{MMSE})$ is an interference correlations term having elements associated with the MMSE medium channel response estimates, $R_n$ is a noise modeling term, and α and β are model-fitting parameters.

The processing weights may then be used to form decision statistics. For instance, de-spread traffic symbols $x_{traffic}(k)$ may be combined to form a symbol estimate:

$$\hat{z}_{traffic}(k) = w^H x_{traffic}(k), \quad (27)$$

which may be detected using conventional detection methods.

Baseband processor 16 may also include a signal quality estimator 42 for generating an estimate of received signal quality, such as a signal-to-interference-plus-noise ratio (SINR), again based on the impairment correlations estimate and the MMSE net channel response estimate. In a G-RAKE embodiment, for example, signal quality estimator 42 calculates SINR according to:

$$SINR = h_{MMSE}^H R_u^{-1} h_{MMSE}. \quad (28)$$

Those skilled in the art will be familiar with corresponding formulas for RAKE receiver and/or chip equalizer configurations.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of signal processing in a CDMA receiver, comprising:
   calculating a channel response correlation matrix based on measured channel responses derived from pilot symbols in a received signal;

forming a traffic data correlation matrix based on measurements of traffic symbols in the received signal; and
using a minimum mean-squared error (MMSE) estimation process, calculating channel response estimates as a function of the traffic data correlation matrix, the channel response correlation matrix, and the measured channel responses.

2. The method of claim 1, wherein calculating channel response estimates as a function of the traffic data correlation matrix, the channel response correlation matrix, and the measured channel responses comprises calculating net channel response estimates corresponding to a plurality of signal processing delays in a G-RAKE receiver.

3. The method of claim 1, wherein calculating the channel response correlation matrix comprises calculating a medium channel response estimate for each of a plurality of path delays for a received signal, based on the measured channel responses, and calculating the channel response correlation matrix based on the medium channel response estimates.

4. The method of claim 3, wherein calculating a medium channel response estimate for each of a plurality of path delays comprises:
measuring a net channel response for each of a plurality of signal processing delays, using the pilot symbols, to obtain the measured channel responses; and
calculating the medium channel response estimates based on the measured channel responses and information relating medium channel response at the path delays to net channel response at the signal processing delays.

5. The method of claim 1, wherein calculating a channel response correlation matrix comprises calculating a fading correlation matrix based on the measured channel responses and calculating the channel response correlation matrix based on the fading correlation matrix and information relating medium channel response at the path delays to net channel response at the signal processing delays.

6. The method of claim 5, wherein calculating a channel response correlation matrix further comprises smoothing the fading correlation matrix using a previously calculated fading correlation matrix corresponding to an earlier time interval and calculating the channel response correlation matrix based on the smoothed fading correlation matrix.

7. The method of claim 5, wherein calculating a fading correlation matrix comprises computing a correlation matrix based on the measured channel responses and setting off-diagonal elements of the correlation matrix to zero to obtain the fading correlation matrix.

8. The method of claim 1, further comprising:
calculating an estimation figure of merit for the calculated channel response estimates;
calculating a corresponding figure of merit for the measured channel responses; and
selecting either the calculated channel response estimates or the measured channel responses for subsequent receiver processing, based on a comparison of the figures of merit.

9. The method of claim 1, further comprising:
calculating combining weights for each of a plurality of signal processing delays, based on the channel response estimates; and
forming a decision statistic for one or more traffic data symbols, using the combining weights.

10. The method of claim 1, further comprising calculating a revised channel response correlation matrix based on the channel response estimates and calculating revised channel response estimates based on the revised channel response correlation matrix, the traffic data correlation matrix, and the channel response estimates.

11. The method of claim 10, further comprising:
calculating combining weights for each of a plurality of signal processing delays, based on the revised channel response estimates; and
forming a decision statistic for one or more traffic data symbols, using the combining weights.

12. A receiver circuit comprising a baseband processor configured to:
calculate a channel response correlation matrix based on measured channel responses derived from pilot symbols in a received signal;
form a traffic data correlation matrix based on measurements of traffic symbols in the received signal; and,
using a minimum mean-squared error (MMSE) estimation process, calculate channel response estimates as a function of the traffic data correlation matrix, the channel response correlation matrix, and the measured channel responses.

13. The receiver circuit of claim 12, wherein the baseband processor is configured to calculate channel response estimates comprising net channel response estimates corresponding to G-RAKE receiver signal processing delays.

14. The receiver circuit of claim 12, wherein the baseband processor is configured to calculate the channel response correlation matrix by calculating a medium channel response estimate for each of a plurality of path delays for a received signal, based on the measured channel responses, and calculating the channel response correlation matrix based on the medium channel response estimates.

15. The receiver circuit of claim 14, wherein the baseband processor is configured to calculate the medium channel response estimate for each of a plurality of path delays by:
measuring a net channel response for each of a plurality of signal processing delays, using the pilot symbols, to obtain the measured channel responses; and
calculating the medium channel response estimates based on the measured channel responses and information relating medium channel response at the path delays to net channel response at the signal processing delays.

16. The receiver circuit of claim 12, wherein the baseband processor is configured to calculate the channel response correlation matrix by calculating a fading correlation matrix based on the measured channel responses and calculating the channel response correlation matrix based on the fading correlation matrix and information relating medium channel response at the path delays to net channel response at the signal processing delays.

17. The receiver circuit of claim 16, wherein the baseband processor is further configured to calculate the channel response correlation matrix by smoothing the fading correlation matrix using a previously calculated fading correlation matrix corresponding to an earlier time interval and calculating the channel response correlation matrix based on the smoothed fading correlation matrix.

18. The receiver circuit of claim 16, wherein the baseband processor is configured to calculate the fading correlation matrix by computing a correlation matrix based on the measured channel responses and setting off-diagonal elements of the correlation matrix to zero to obtain the fading correlation matrix.

19. The receiver circuit of claim 12, wherein the baseband processor is further configured to:
calculate an estimation figure of merit for the calculated channel response estimates;

calculate a corresponding figure of merit for the measured channel responses; and select either the calculated channel response estimates or the measured channel responses for subsequent receiver processing, based on a comparison of the figures of merit.

20. The receiver circuit of claim 12, wherein the baseband processor is further configured to:

calculate combining weights for each of a plurality of signal processing delays, based on the channel response estimates; and form a decision statistic for one or more traffic data symbols, using the combining weights.

21. The receiver circuit of claim 12, wherein the baseband processor is further configured to calculate a revised channel response correlation matrix based on the channel response estimates, and to calculate revised channel response estimates based on the revised channel response correlation matrix, the traffic data correlation matrix, and the channel response estimates.

22. A wireless communication device including the receiver circuit of claim 12.

23. A wireless communication device comprising:

a parameter estimation unit configured to calculate a channel response correlation matrix based on measured channel responses derived from pilot symbols in a received signal, form a traffic data correlation matrix based on measurements of traffic symbols in the received signal, and, using a minimum mean-squared error (MMSE) estimation process, calculate channel response estimates as a function of the traffic data correlation matrix, the channel response correlation matrix, and the measured channel responses; and circuitry configured to calculate combining weights for each of a plurality of signal processing delays, based on the channel response estimates, and form a decision statistic for one or more traffic data symbols, using the combining weights.

* * * * *

UNITED STATES PATENT AND TRADEMARK OFFICE
CERTIFICATE OF CORRECTION

PATENT NO. : 7,983,208 B2
APPLICATION NO. : 11/935604
DATED : July 19, 2011
INVENTOR(S) : Cairns It is certified that error appears in the above-identified patent and that said Letters Patent is hereby corrected as shown below:

In Column 6, Line 66, delete "a" and insert -- $\alpha$ --, therefor.

In Column 10, Lines 28-29, delete "$g_{MMSE}32(B^HB)^{-1}B^Hh_{MMSE}$." and insert -- $g_{MMSE}=(B^HB)^{-1}B^Hh_{MMSE}$. --, therefor.

Signed and Sealed this
Twentieth Day of March, 2012

David J. Kappos
*Director of the United States Patent and Trademark Office*